United States Patent [19]

Hashimoto et al.

[11] Patent Number: 4,538,698
[45] Date of Patent: Sep. 3, 1985

[54] MOTOR-DRIVEN POWER STEERING SYSTEM

[75] Inventors: Akio Hashimoto, Kawasaki; Tomio Yasuda, Kasukabe, both of Japan

[73] Assignee: Aisin Seiki Kabushiki Kaisha, Kariya, Japan

[21] Appl. No.: 571,272

[22] Filed: Jan. 16, 1984

[30] Foreign Application Priority Data

Jan. 17, 1983 [JP] Japan ................................. 58-5493

[51] Int. Cl.³ ............................................. B62D 5/04
[52] U.S. Cl. .................................. 180/79.1; 180/142; 180/143
[58] Field of Search ...................... 180/79.1, 142, 143

[56] References Cited

FOREIGN PATENT DOCUMENTS

| 2313706 | 9/1974 | Fed. Rep. of Germany | 180/79.1 |
| 48404 | 4/1984 | Fed. Rep. of Germany | 180/79.1 |
| 48302 | 2/1983 | Japan | 180/79.1 |
| 1395954 | 5/1975 | United Kingdom | 180/79.1 |

*Primary Examiner*—William L. Freeh
*Attorney, Agent, or Firm*—Sughrue, Mion, Zinn, Macpeak and Seas

[57] ABSTRACT

A power steering system makes use of a direct-current servomotor to produce an auxiliary torque added to the torque which is applied to the steering wheel of a vehicle by the driver. The system includes an electronic apparatus, which receives a signal indicating the velocity of the vehicle, divides the whole range of the vehicle velocity into at least three ranges, and determines under which of these ranges the present velocity falls. In the lowest range, the control apparatus energizes the motor to produce such an auxiliary torque. In the middle range, the apparatus de-energizes the motor and so no auxiliary torque is generated. In the highest range, the apparatus connects a load such as a resistor with the coil in the motor to brake the rotation of the steering wheel.

5 Claims, 12 Drawing Figures

MOTOR-DRIVEN POWER STEERING SYSTEM

FIELD OF THE INVENTION

The present invention relates to a power steering system using an electric motor to produce an auxiliary steering force for augmenting the torque that is applied to the steering wheel of a vehicle by the driver.

BACKGROUND OF THE INVENTION

When a vehicle is at rest or moving at a lower velocity, a large force is required to rotate the steering wheel for veering the tires. Especially, so-called FF (front-engine, front wheel) vehicles which have become increasingly popular in recent years require still greater force to be applied to the steering wheel, because the front tires of this kind of vehicle bear greater weight.

It is known that a power steering system augments the torque that is applied to the steering wheel of a vehicle by the driver. This steering system produces a driving force in response to the manual steering force exerted by the driver, and the produced force is transmitted to the steering mechanism. Most power steering systems which are now put into practical use are hydraulic in structure. In particular, such a hydraulic system includes a control valve, a hydraulic cylinder, etc., and produces an auxiliary steering force by moving oil in response to the steering force applied by the driver.

Unfortunately, the aforementioned control valve, oil cylinder, and so forth are bulky. Further, pipings for interconnecting these components cannot be bent with a curvature less than a given value to prevent occurrence of a large pressure loss. In addition, a hydraulic system requires seals to be certainly installed for preventing oil leakage. Furthermore, it is cumbersome to install such a hydraulic system. For these reasons, it is difficult to install a power steering system in a vehicle having a small space available for the installation such as an FF vehicle.

Meanwhile, a larger force is needed to steer a vehicle as the velocity decreases, and vice versa. The prior art power steering system operates at all times, irrespective of the vehicle velocity. Therefore, no problem arises at lower velocities, but the force necessary to steer the vehicle is inordinately reduced at higher velocities. This may introduce the possibility that a driver who is unaccustomed to the power steering system rotates the steering wheel through an excessive angle, thus incurring a danger. Also, that a somewhat large force is required to steer the vehicle when it runs at a high velocity makes it easier for drivers accustomed to power steering to drive the vehicle. Thus, a power steering system has been proposed which measures the velocity of the vehicle and produces an auxiliary torque matched to the velocity. However, the control system of the steering system is very complicated and hence it is expensive.

In view of the foregoing situations, the present applicant has proposed a motor-driven power steering system in Japanese Patent Application No. 174753/1982, in which when the velocity of the vehicle is lower than a predetermined value an electric motor is energized according to a detected torque to amplify the torque applied to the steering wheel by the driver, while when the value is exceeded the motor is de-energized. This proposed system provides a relatively simple structure, and it functions satisfactorily as a power steering system at low velocities, where an auxiliary torque is necessitated.

Conventional velocity-responsive type power steering systems including the system described just above are inactive at high velocities. If the force needed to steer the vehicle at high velocities is greater than that needed at moderate velocities, then the driving would be facilitated.

SUMMARY OF THE INVENTION

It is an object of the present invention to provide a motor-driven power steering system which makes the force needed to operate the steering wheel at high velocities greater than the force that is required when a power steering is not available.

It is another object of the invention to provide a motor-driven power steering system which moderates changes in the driver's steering feeling that are caused according to changes in the vehicle speed.

To achieve these objects, the system according to the invention uses an electric motor such as a direct-current motor as a driving source and divides the vehicle velocity into at least three ranges by utilizing the signal obtained from a velocity detector. In the first range of the velocity, the system receives the signal from steering torque detectors and causes the motor to produce a torque according to the torque exerted by the driver for amplifying the latter torque. In the second range, the motor is de-energized. In the third range, a load such as a resistor is connected to the coil in the motor to brake the rotation for steering.

More specifically, when the load is not connected to the coil in the motor, the motor is not energized and so it will not exert a braking force on any external force. On the other hand, when the load is connected, an electric current corresponding to the magnitude of the load flows into the coil, and therefore the motor will produce a force in a direction opposed to an externally applied force, namely a braking force. Thus, in the third range, i.e., at high velocities, the servo ratio defined as the ratio of the output torque to the input torque applied by the driver is less than unity. This makes the force needed to steer the vehicle greater than the force required when a power steering is not available. As a result, the driver can get a better steering feeling at high velocities.

In one preferred aspect of the invention, each of the first and third ranges of the velocity is subdivided into two, and the characteristics in the subranges are so set that they give the most favorable steering feeling to the driver and that the controlled torque at the maximum or minimum velocity in one range or subrange equals to the controlled torque at the minimum or maximum velocity in the next higher or lower range or subrange, in order to prevent occurrence of a large change in the steering torque when the velocity moves from one range or subrange to a neighboring range or subrange.

In another preferred aspect of the invention, the time during which the load connected to the motor is controlled by the duration of pulses in such a way that the controlled torque changes according to the vehicle velocity. This can prevent the steering feeling given to the driver from changing abruptly.

Other objects and features of the invention will appear in the course of description thereof which is taken in conjunction with the accompanying drawings.

DETAILED DESCRIPTION OF THE INVENTION

Figures 1, 3:
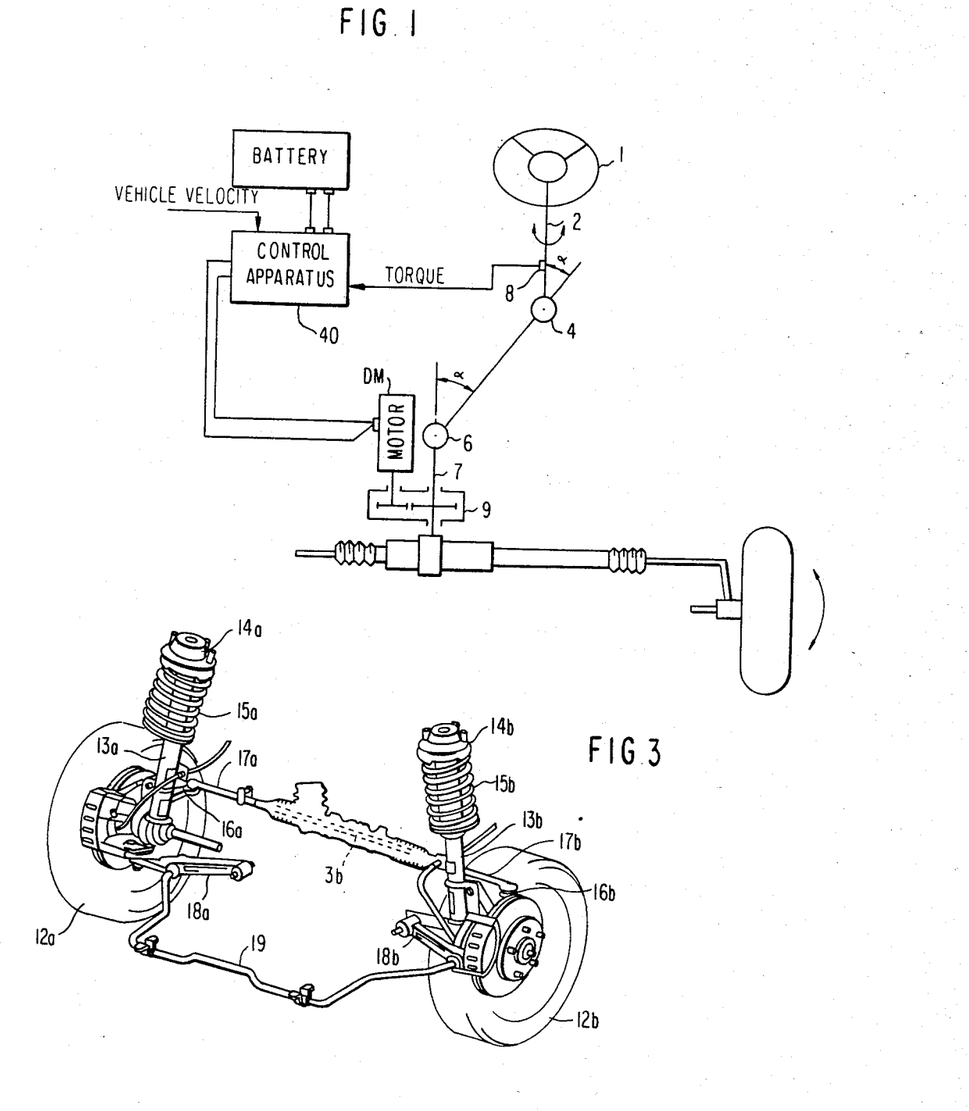
FIG. 1 is a schematic block diagram of a motor-driven power steering system according to the present invention.
FIG. 3 is a perspective view of the steering mechanism connected to the system shown in FIG. 2.

Referring to FIG. 1, the whole construction of a motor-driven power steering system embodying the concept of the invention is schematically shown. In this system, a first steering shaft 2 is connected to the steering wheel 1 of a vehicle, and a second steering shaft 5 is connected to the first shaft 2 via a first universal joint 4. A third steering shaft 7 is connected to the second shaft 5 via a second universal joint 6. Firmly fixed to the tip of the third shaft 7 is a pinion 3a (see FIG. 2) with which a rack 3b (see FIG. 3) for driving the steering wheel meshes. The angle α at which the second shaft 5 is inclined from the first shaft 2 is equal to the angle α at which the third shaft 7 is inclined from the second shaft 5. Torque sensors 8 (only one is shown in FIG. 1) are fixedly secured to the first shaft 2. A direct-current servomotor DM is connected to the third shaft 7 via a reduction gearing 9. The output of each sensor 8 is connected to a control apparatus 40, the output of which is connected with the motor DM. A vehicle velocity sensor which is connected with a speedometer cable produces a signal to the control apparatus 40.

Figure 2:
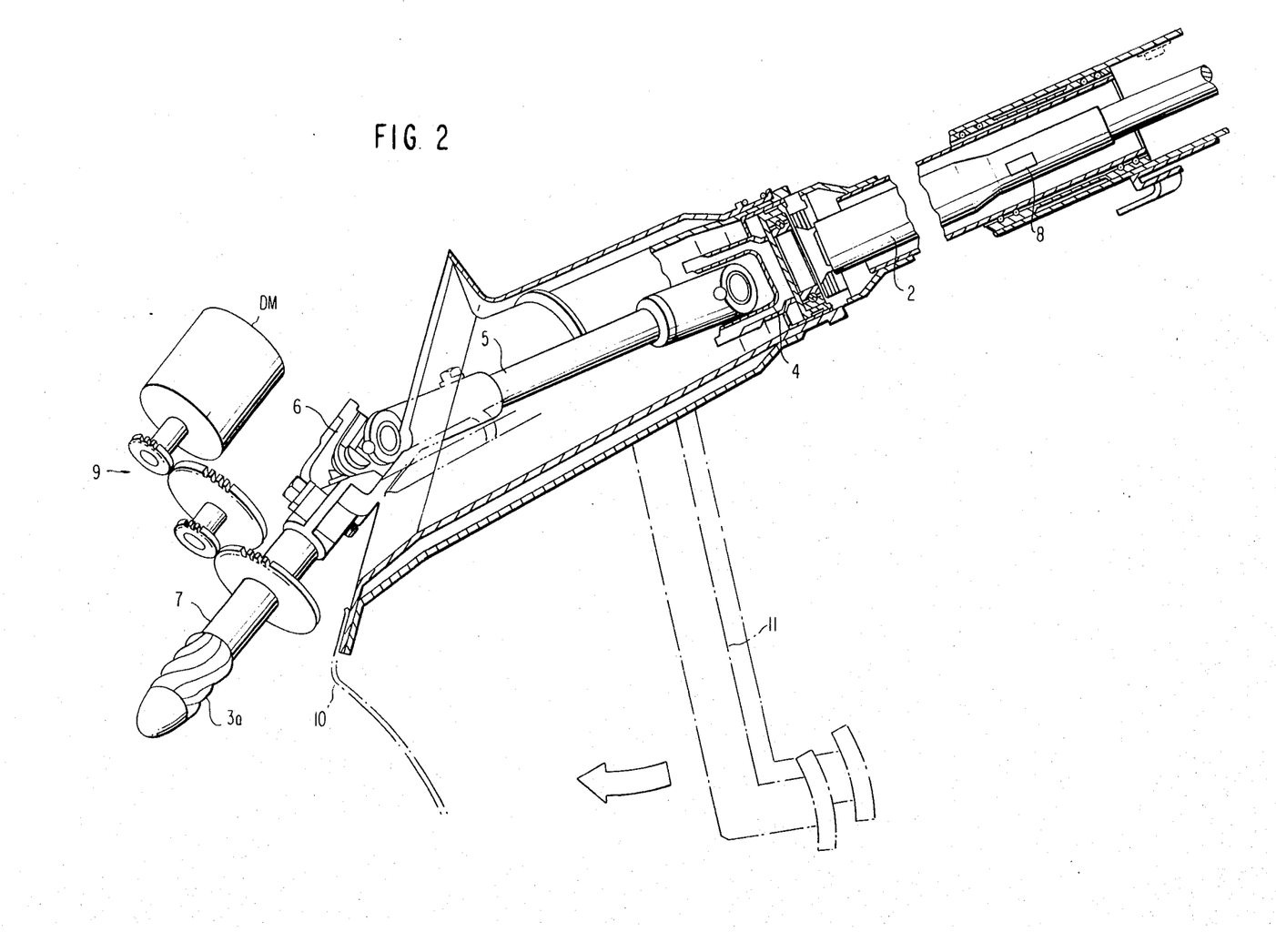
FIG. 2 is an enlarged sectional view of the main portions of the system shown in FIG. 1.

Referring next to FIG. 2, there is shown the portion of the mechanism shown in FIG. 1 at the driver's feet in section. In this illustrative example, the reduction gearing 9 consists of a combination of four gears and reduces the velocity of the rotation of the motor DM by a factor of six before transmitting the force to the second shaft 5. In this example, strain gauges are used for the torque sensors 8. Although only one of the sensors 8 is shown, the other torque sensor is firmly secured to the back side of the first shaft 2. That is, in this example, the force necessary to rotate the steering wheel is detected by measuring the torsion of the shaft 2. Each of these torque sensors 8 incorporates two sensors which respond in different directions. In this example, these four sensors are assembled into a bridge circuit to make the system independent of temperature. The steering mechanism shown in FIG. 2 extends through two spaces which are separated by a toe board 10 disposed near the second universal joint 6. The space on the left side of the board 10 as viewed in FIG. 2 is the engine room of the vehicle, while the space on the right side is the passenger's compartment. Indicated by reference numeral 11 is the brake pedal.

Referring next to FIG. 3, the revolving shafts of the front tires 12a and 12b of the vehicle are held to upper suspension supports 14a and 14b via shock absorbers 13a and 13b, respectively. A coiled spring 15a is mounted between the absorber 13a and the support 14a. Similarly, another coiled spring 15b is mounted between the absorber 13b and the support 14b. Connected to the bearings of the tires 12a and 12b are steering knuckle arms 16a and 16b, respectively, which are also coupled to the rack 3b through tie rods 17a and 17b, respectively. The aforementioned pinion 3a meshes with the rack 3b. Also shown are lower suspension arms 18a, 18b and a stabilizer 19.

Figure 4:
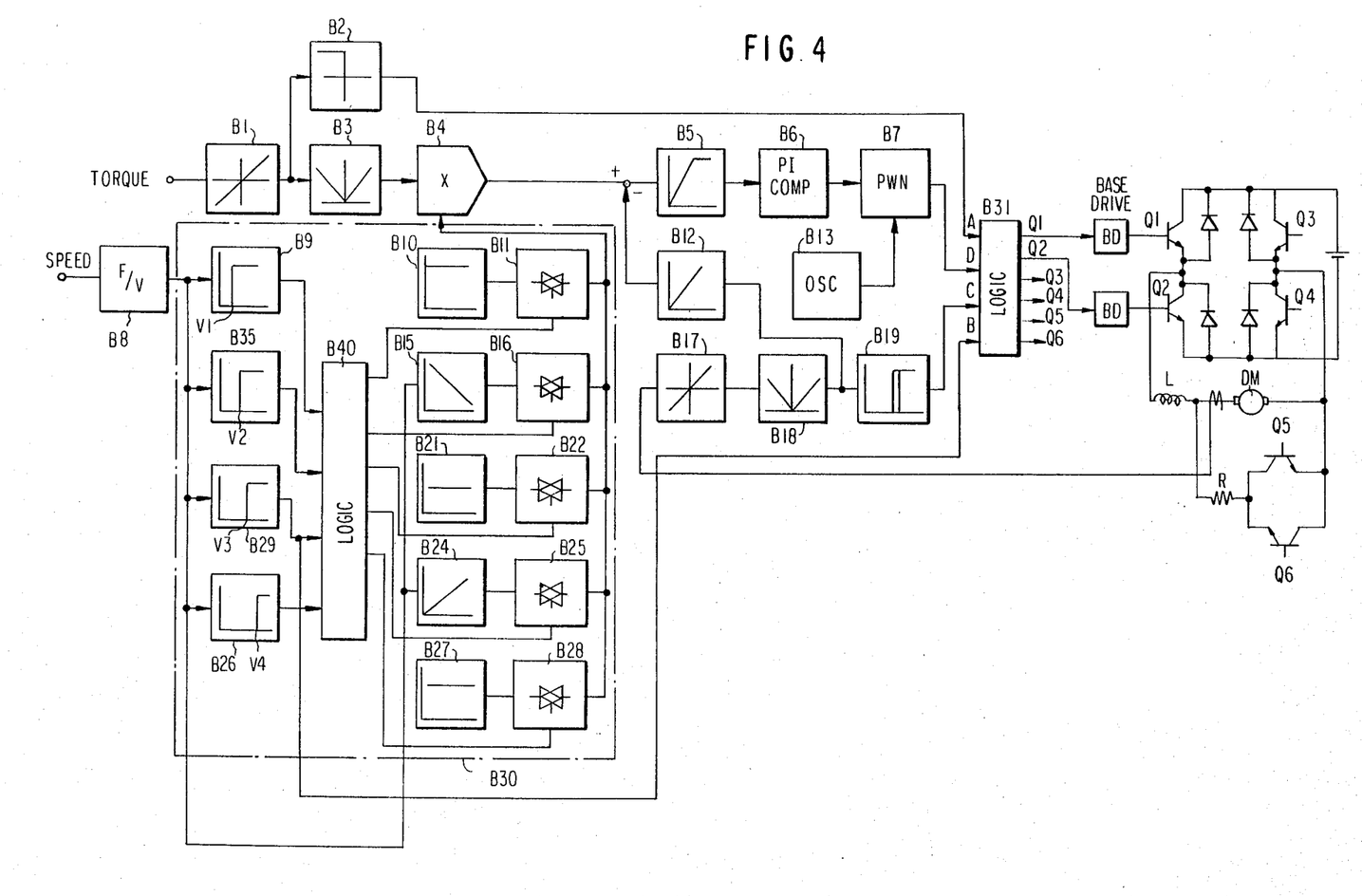
FIG. 4 is a schematic block diagram of the electric circuit of the system shown in FIG. 1.
Figure 5:
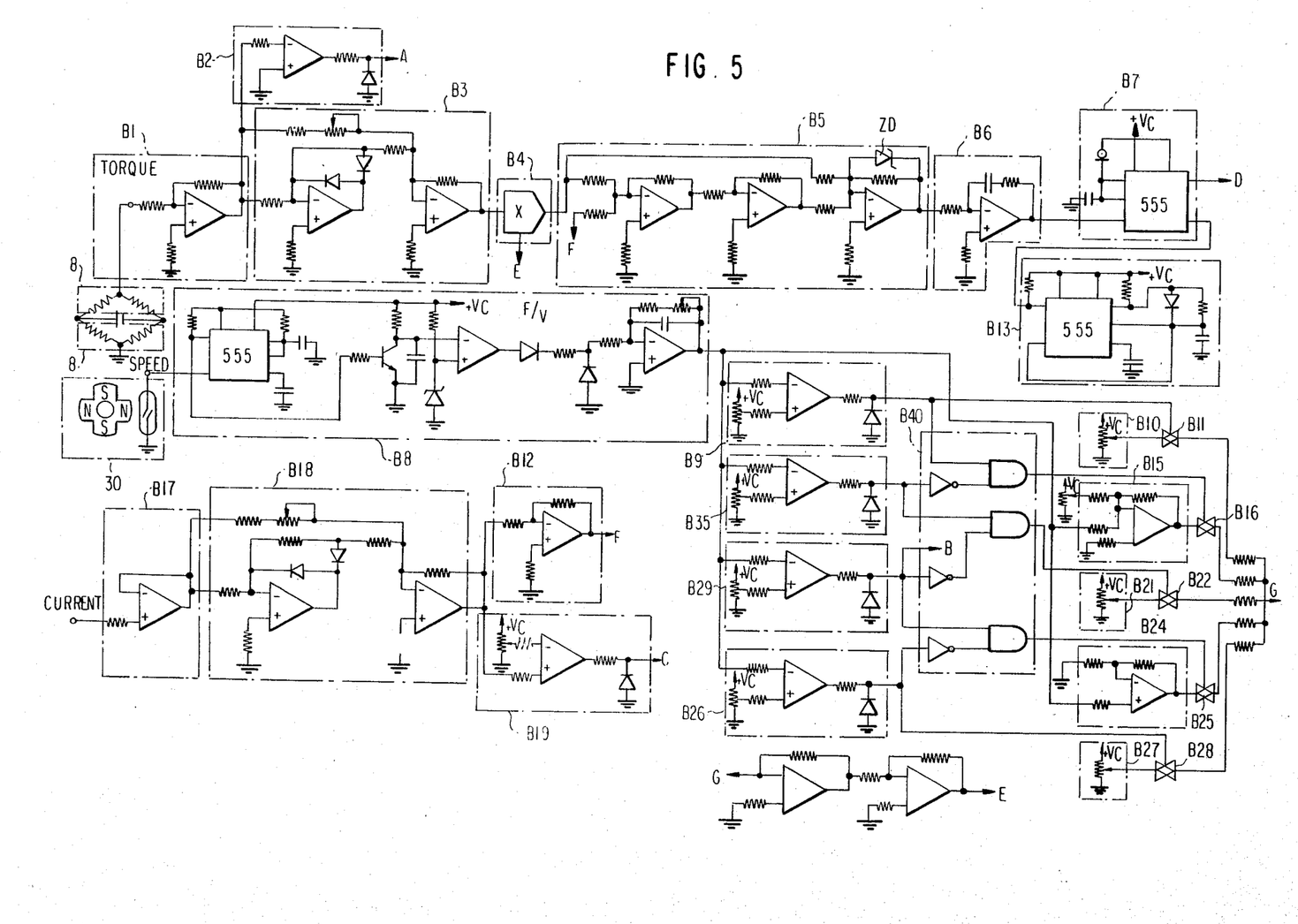
FIG. 5 is a detailed block diagram of a portion of the circuit shown in FIG. 4.
Figure 6:
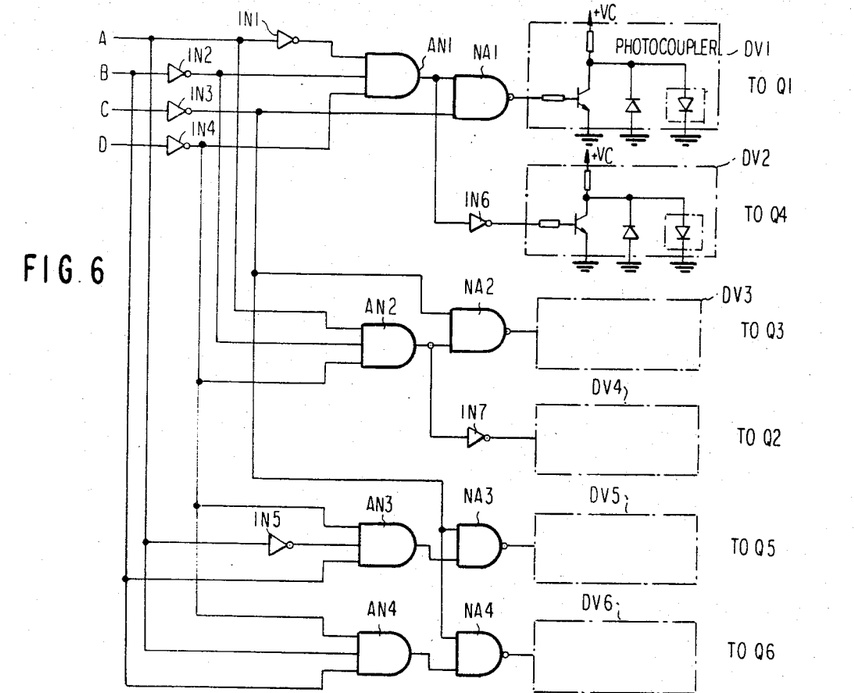
FIG. 6 is a detailed block diagram of another portion of the circuit shown in FIG. 4.

FIG. 4 schematically shows the configuration of the electric circuit of the motor-driven power steering system shown in FIG. 1. The graphs in the blocks in FIG. 4 schematically represent the electric characteristics of these blocks. In blocks B1, B2, B3, B5, B12, B17, B18, and B19, each abscissa indicates the input level, while each ordinate indicates the output level. In blocks B9, B10, B15, B21, B24, B26, B27, B29, and B35, each abscissa indicates the vehicle velocity, whereas each ordinate indicates the output level. In FIGS. 5 and 6, each resistor is represented in the form of a small rectangle.

Referring next to FIGS. 4–6, the aforementioned two torque sensors 8 constitute a resistance bridge, the output of which is connected to the block B1 that is an ordinary linear amplifier. The output of the block B1 is connected to the two blocks B2 and B3. The block B2 is a comparator to sense the direction of the input torque. The output of the block B2 is tied to input terminal A of a logic circuit B31 (described later). The block B3 is an absolute-value circuit which produces a positive output linearly proportional to its input signal, irrespective of the polarity of the input signal. The output signal from the block B3 is applied to a multiplier B4.

The signal from a vehicle velocity sensor 30 is applied to a frequency-to-voltage converter circuit B8, where the signal is converted into voltage. The output voltage from the converter circuit B8 is fed to the multiplier B4 via a function generator B30, which consists of comparators B9, B35, B29, B26, logic circuit B40, voltage generators B10, B15, B21, B24, B27, and analog switches B11, B16, B22, B25, B28. The comparators B9, B35, B29, and B26 deliver binary signals by comparing their input signals with preset vehicle velocities V1, V2, V3, and V4, respectively. The logic circuit B40 judges under which of the five ranges the present vehicle velocity falls, based upon the binary signals from the comparators B9, B35, B29, and B26, and then it closes or opens the analog switches connected to the associated voltage generators for every range of the velocity. The output of the comparator B29 is coupled to input terminal B of the logic circuit B31, which should be produced, an auxiliary torque or a braking force.

In this illustrative example, in the range of velocity from zero to V1, the analog switch B11 is closed to select the voltage generator B10, and all the other switches are opened. Likewise, in the velocity ranges of V1 to V2, V2 to V3, V3 to V4, and V4 to V5, the analog switches B16, B22, B25, and B28 are closed, respectively, to select the voltage generators B15, B21, B24, and B27, respectively. The signal from the selected one of the voltage generators is supplied to the multiplier B4 via the associated analog switch. The voltage generators B10, B21, and B27 produce given voltages which have been already determined by the setting of variable-resistors. The voltage generators B15 and B24 produce voltages which change depending on the vehicle velocity. The generator B15 addes a predetermined bias level set by a variable-resistor to a voltage corresponding to the vehicle velocity, and then it delivers a voltage in inverse proportion to the vehicle velocity.

The multiplier B4 delivers an output whose level is the product of the torque signal from the block B4 and the signal which is produced from the function generator B30 according to vehicle velocity. This output from the multiplier B4 is applied to the differential amplifier B5 which amplifies the difference between the output signal from the multiplier B4 and the signal that is obtained by feeding a motor current (described later) back to its input stage. However, the output level from the amplifier B5 is kept constant if the output level reaches a predetermined level set by the characteristic of a zener diode ZD. The output signal from the amplifier B5 is furnished to a pulse-duration modulation circuit B7 via a PI compensating circuit B6. The modulation circuit B7 delivers an output signal, which is modulated in pulse duration according to the output level from the circuit B6, but which has the same duration as the signal from an oscillator B13. The modulation signal is applied to input terminal D of the logic circuit B31. In this specific example, the oscillator B13 produces a frequency of 2 KHz.

The line connected to the coil in the motor DM has a current transformer CT connected thereto. The signal from the transformer CT is fed back to the amplifier B17, the output of which is connected to an amplifier B12 and a comparator B19 via an absolute-value circuit B18. The output signal from the amplifier B12 is applied to the amplifier B5. The comparator B19 has hysteresis and produces an output signal to input terminal C of the logic circuit B31.

Switching transistors Q1-Q6 for controlling the motor current are connected to the respective output terminals of the logic current B31 via their respective base drivers BD. The transistors Q1-Q4 act to drive the direct-current servomotor DM, and are connected in the form of a bridge to change the direction of current flowing in the coil in the motor DM. In particular, by driving two of these transistors which are diametrically opposed to each other, a current flows in the coil in a given direction. The transistors Q5 and Q6 serve to control the braking operation by controlling electrical connection between the coil in the motor DM and a resistor R. Specifically, by driving the transistor Q5 or Q6 on, the resistor R is connected to the coil, so that a current flows into the motor through this path. As a result, rotation of the motor DM is braked. A direct-current reactor L prevents the pulse-duration control operation from producing intermittent current.

Referring next to FIG. 6, the logic circuit B31 consists of AND gates AN1-AN4, NAND gates NA1–NA4, inverters IN1-IN7, and drivers DV1-DV6. All the drivers DV1-DV6 have the same configuration, and each is provided with a photocoupler including a light-emitting diode. Phototransistors which are to be optically coupled to the respective light-emitting diodes are incorporated in the base drivers BD connected to the bases of the transistors Q1-Q6. Thus, when the light-emitting diodes of the drivers DV1-DV6 light up, the associated transistors Q1-Q6 are driven on.

Figure 7:
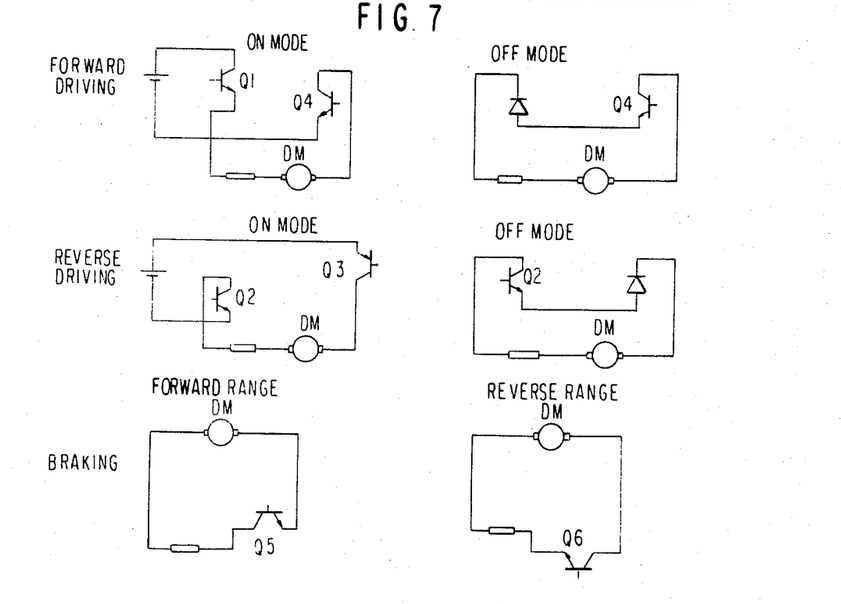
FIG. 7 is a schematic representation for showing the manner in which the motor of FIG. 4 is connected in various operation modes of the circuit of FIG. 4.

FIG. 7 shows the manner in which the servomotor DM is connected in various operation modes. The states of the transistors Q1-Q6 in various modes of the system are listed Table 1 below.

Referring to FIG. 7 and Table 1, when the velocity of the vehicle is less than V2 and an auxiliary torque is to be produced by the motor DM, if the driver applies a forward

TABLE 1

| mode condition | auxiliary torque velocity < set value V2 | | braking velocity > set value V3 | |
| --- | --- | --- | --- | --- |
| direction | forward | reverse | forward | reverse |
| transistor | | | | |
| Q1 | ON | OFF | OFF | OFF |
| Q2 | OFF | ON | OFF | OFF |
| Q3 | OFF | ON | OFF | OFF |
| Q4 | ON | OFF | OFF | OFF |
| Q5 | OFF | OFF | ON | OFF |
| Q6 | OFF | OFF | OFF | ON | torque to the steering shaft, then the transistors Q1 and Q4 are turned on, as can be seen from the diagram of FIG. 7 written as "forward driving". Thus, an electric current flows into the armature in such a direction that the motor is rotated forwardly. In this example, current is not continuously supplied, but rather the transistor Q1 is turned on and off with a certain period by the pulse duration-modulated signal from the control apparatus. Hence, the circuit driving the motor is alternately energized and de-energized.

When the driver applies a reverse torque to the steering shaft, the transistors Q2 and Q3 are driven on, as can be seen from the diagram of FIG. 7 written as "reverse driving", and a current flows in such a direction that the motor DM reverses. In this case, the transistor Q3 is alternately turned on and off with a certain period by the pulse duration-modulated signal from the control circuit.

When the vehicle velocity exceeds V3, the transistor Q5 or Q6 is driven on with a certain period, depending on the direction of the torque applied to the steering shaft, as can be seen from the diagrams of FIG. 7 written as "braking". Thus, the armature coil of the motor DM is shorted out via the braking resistor R, thus generating an electric current in the coil itself. The result is that the motor DM sets up a driving torque in a direction opposite to the input torque, i.e., a braking torque.

Figure 8:
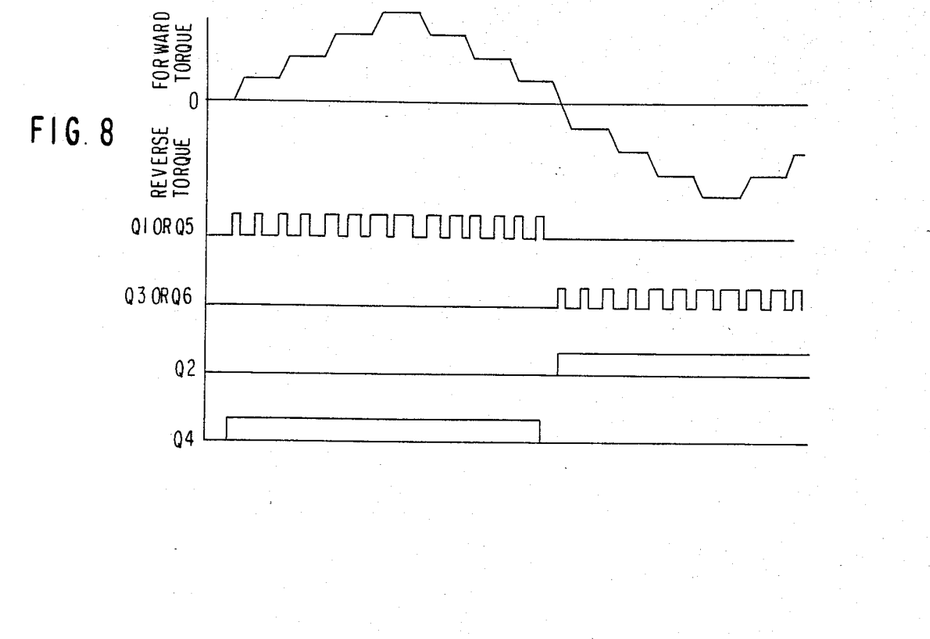
FIG. 8 is a timing chart of waveforms appearing during one operation of the circuit shown in FIG. 4.

Referring next to FIG. 8, the timings of the operations of the transistors Q1-Q6 in relation to the input torque are illustrated. In case of auxiliary torque mode, the transistor Q1 or Q2 is periodically driven on and off, depending on the direction of the input torque. The periods during which the transistor is in ON and OFF states depend on the magnitude of the torque. The electric energy supplied to the motor DM is proportional to the period during which the transistor Q1 or Q2 is in ON state, and therefore the motor DM produces an auxiliary torque corresponding to the input torque.

In case of braking mode, the transistor Q5 or Q6 is periodically driven on and off, depending on the direction of the input torque, similarly to the foregoing. The periods during which the transistor is in ON and OFF states depend on the magnitude of the input torque. The braking torque produced depends on the magnitude of the current flowing in the armature coil in the motor DM. Since the magnitude of the current is in proportion to the period during which the transistor Q5 or Q6 is in ON state, the braking torque produced corresponds to the input torque.

Figure 9:
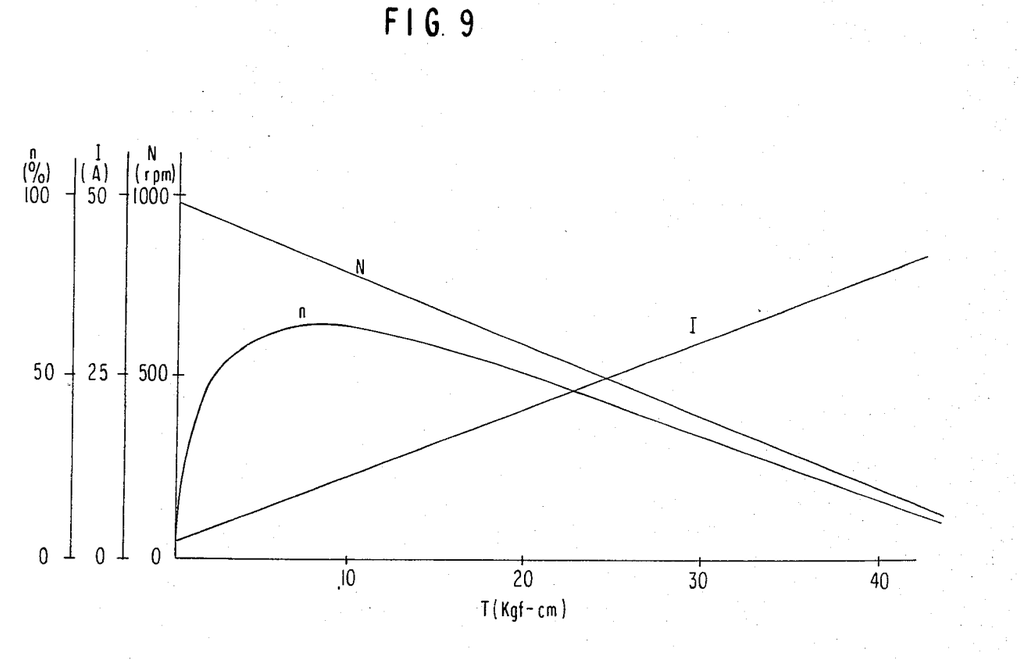
FIG. 9 is a graph showing the operation characteristics of the direct-current servomotor DM used in the system of FIG. 1.

FIG. 9 shows the characteristics of the direct-current servomotor DM used in the embodiment described above. It can be seen from this graph that the output torque T is proportional to the current I flowing in the motor. In the graph, N and $\eta$ denote the rotational frequency and the efficiency, respectively.

Figure 10A:
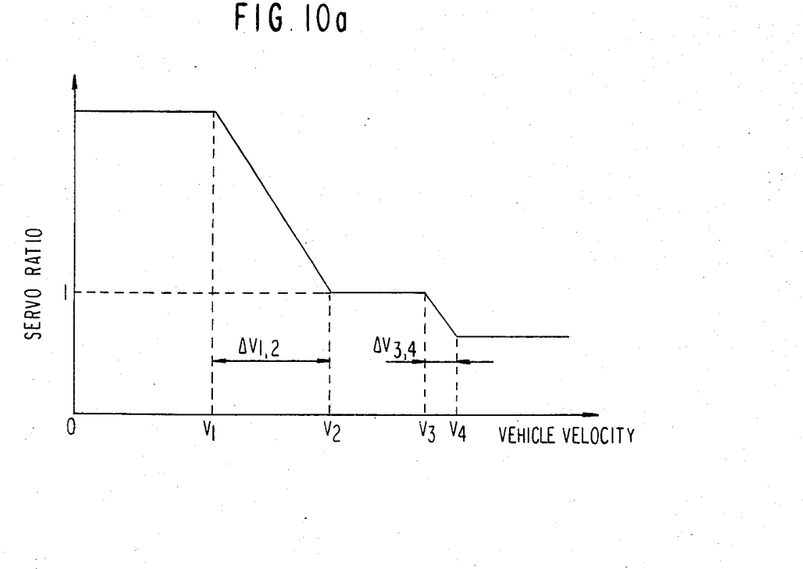
FIG. 10a is a graph showing the relation between the vehicle velocity and the servo ratio of the system shown in FIG. 1.
Figure 10B:
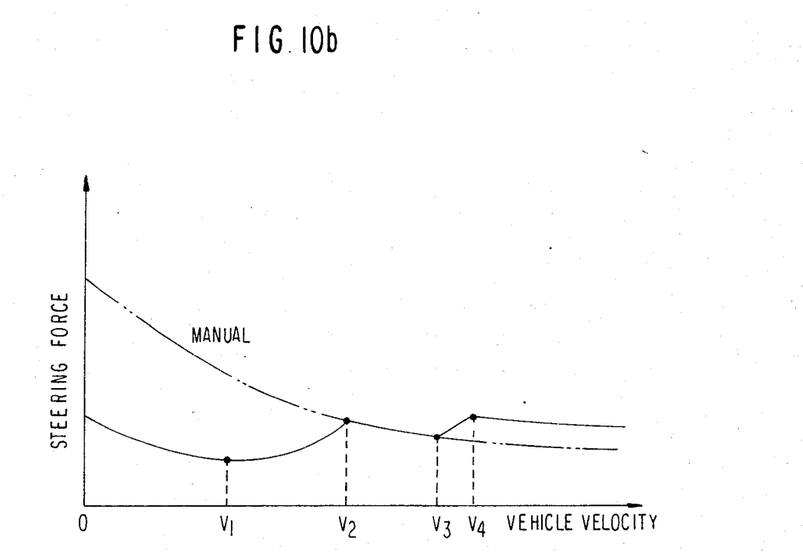
FIG. 10b is a graph showing the relations between the vehicle velocity and the torque applied by a driver when the power steering system of FIG. 1 operates and when it does not.

FIG. 10a shows the vehicle velocity servo ratio characteristic of the power steering system of the above embodiment. FIG. 10b shows the vehicle velocity-driver's torque characteristic of the system. Referring to FIGS. 5, 10a and 10b, when the vehicle velocity is in the range of 0 to V1, the analog switch B11 is closed and all the other analog switches are maintained open. This allows the voltage generator B10 to apply a constant voltage to the mulipler B4, irrespective of the vehicle velocity. In this case, the intended value of the control system depends on the input torque signal from the torque sensors 8. That is, the servo ratio is held at a given value. Since the steering torque applied by the driver is augmented by the motor DM, the force that the driver must apply is considerably smaller than the force required when no power steering is available. In this range, as the vehicle velocity increases, the torque that the driver must apply for steering reduces sowewhat.

When the vehicle velocity lies in the range of V1 to V2, the analog switch B16 is closed and all the other switches are kept open, so that the signal from the block B15 is applied to the multiplier B4. The block B15 is an inverting amplifier and is supplied with a given bias, which is so set that the level at the output terminal of the block B15 is equal to the output level from the block B10 when the velocity is V1. Since the block B15 is an inverting amplifier, it delivers an output signal whose level is in inverse proportion to the velocity signal applied to the input. Consequently, in the range of V1 to V2, the servo ratio decreases in inverse proportion to the vehicle velocity. In this example, when the vehicle velocity approaches V2, the auxiliary torque produced by the motor becomes nearly zero, and the servo ratio approaches unity.

When the vehicle velocity lies in the range of V2 to V3, the analog switch B22 is closed, permitting the block B21 to supply a signal of a given level to the multiplier B4. This level is so set that the auxiliary torque generated by the motor DM becomes null. In this range of the vehicle velocity, the servo ratio assumes a value of 1.

When the vehicle velocity is in the range of V3 to V4, the analog switch B25 is closed, allowing the block B24 to furnish a signal to the multiplier B4. Because the block B24 is an ordinary amplifier and is supplied with a vehicle velocity signal, a signal whose level is proportional to the vehicle velocity is applied to the mulipier B4. Accordingly, the pulse-duration modulation circuit B7 controls the pulse duration in such a way that it increases in proportion to the vehicle velocity.

When the vehicle velocity exceeds V3, a signal of a high level H is applied to input terminal B of a logic circuit B31 to bring the system to braking operation mode. Specifically, the transistor Q5 or Q6 is driven on and off, depending on the output from the modulation circuit B7. Since the period during which the transistor Q5 or Q6 is in ON state increases in proportion to the vehicle velocity, the braking torque becomes greater and the servo ratio reduces below 1 with increasing vehicle velocity.

When the vehicle velocity is in excess of V4, the analog switch B28 is closed, permitting the block B27 to apply a signal to the multiplier B4. Since this signal from the block B27 is kept at a constant level at all times, irrespective of the vehicle velocity, the servo ratio is remains unchanged. In this example, the output level from the block B27 is the same as the level of the signal produced from the block B24 when the vehicle velocity is V4. Accordingly, in this embodiment, every portion of the characteristic curve of the servo ratio connects smoothly with the neighboring portions at the vehicle velocities V1, V2, V3, and V4.

Figure 11:
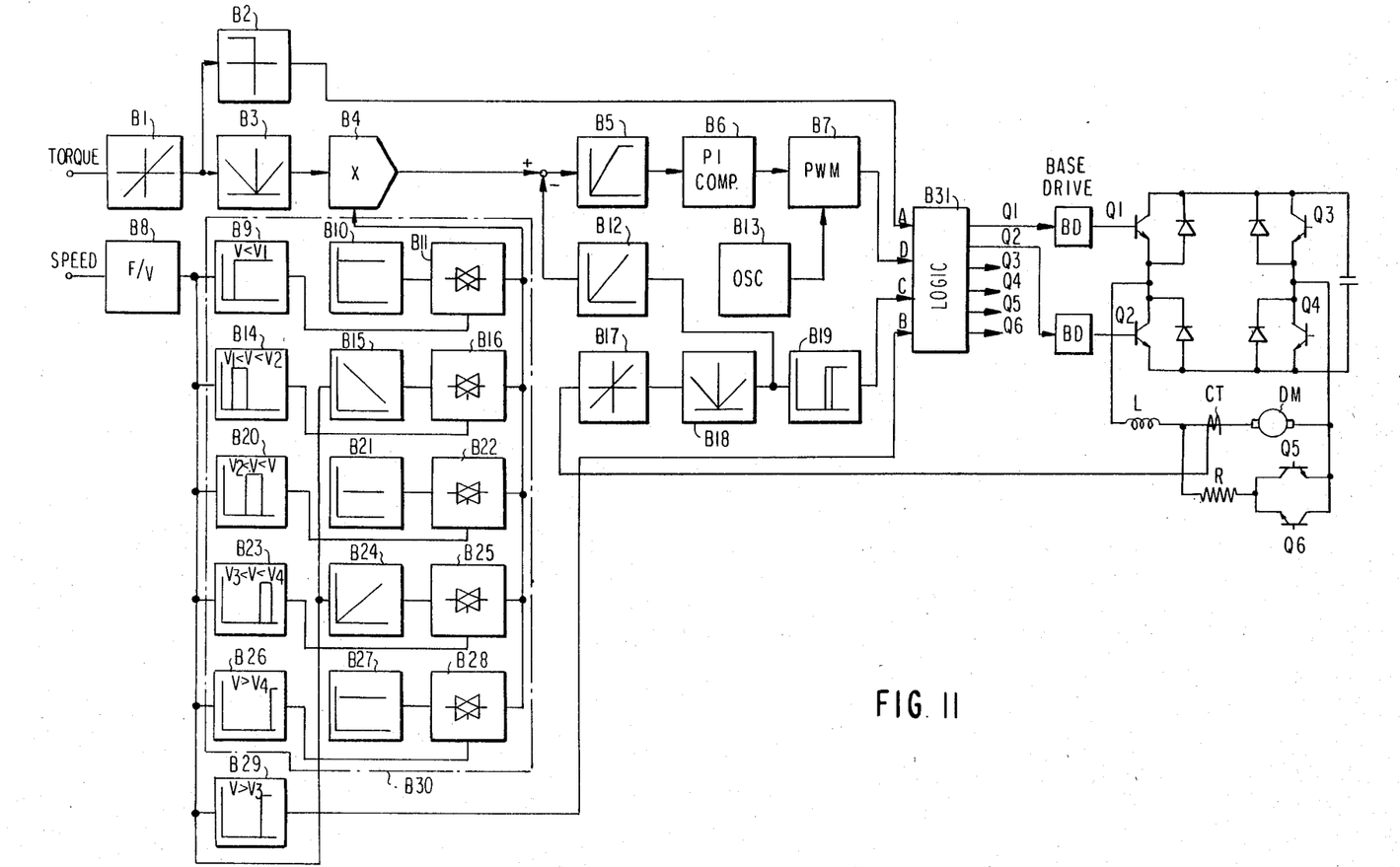
FIG. 11 is a block diagram of another system according to the invention.

In the above embodiment, the four analog comparators B9, B35, B29, B26, and the logic circuit B40 are used to determine the range of the vehicle velocity for obtaining a characteristic as shown in FIG. 10a. It is also possible to employ only analog comparators as shown in FIG. 11 for serving the same purpose. Instead, a further arrangement may be utilized in which the vehicle velocity signal is fed to an analog-to-digital converter, whose output is provided to an ordinary logic circuit or microcomputer for effecting comparison operations, thereby determine the vehicle velocity range.

It is also to be noted that the servo ratio is varied linearly with the vehicle velocity in the ranges of V1 to V2 and of V3 to V4. Alternatively, a characteristic like a quadratic curve may be established. In this alternative embodiment, the voltage generators B15 and B24 shown in FIG. 5, for example, may be replaced by given function generators.

As thus far described, the novel system of the invention brakes the steering action at high velocities, bringing the servo ratio to less than unity. Therefore, the driver can obtain a favorable steering feeling over the whole range of the vehicle velocity.

While preferred embodiments have been described, it is to be understood that various changes and modifications will occur to those skilled in the art within the scope of the present inventive concepts which are delineated by the following claims.

What is claimed is:

1. A motor-driven power steering system comprising:
  an electric motor,
  coupling means for coupling the motor to the steering shaft of a vehicle,
  torque detecting means for detecting the steering torque applied by the driver,
  a motor braking means connected to the coil in the motor, and
  an electronic control apparatus for dividing the range of the velocity of the vehicle into at least three ranges, the control apparatus energizing the motor according to the output signal from the torque detecting means in the first range of the velocity, the control apparatus de-energizing the motor in the second range of the velocity, the control apparatus energizing the braking means in the third range of the velocity.

2. A motor-driven power steering system as set forth in claim 1, wherein the electronic control apparatus subdivides the first range of the velocity into fourth and fifth ranges, the relation between the detected torque and the torque produced by the motor being kept constant in the fourth range, the torque produced by the motor being made smaller as the velocity increases in the fifth range.

3. A motor-driven power steering system as set forth in claim 2, wherein the torque produced by the motor at the minimum velocity in the fifth range is substantially the same as the torque produced by the motor in the fourth range, and wherein the torque produced by the motor at the maximum velocity in the fifth range is almost zero.

4. A motor-driven power steering system as set forth in claim 3 wherein the electronic control apparatus subdivides the third range of the velocity into sixth and seventh ranges, the amount of the braking of the braking means being increased as the velocity increases in the sixth range, the relation between the detected torque and the amount of the braking of the braking means being kept constant.

5. A motor-driven power steering system as set forth in claim 4 wherein the amount of braking of the braking means at the minimum velocity in the sixth range is almost zero, and wherein the amount of braking of the braking means at the maximum velocity in the sixth range is substantially the same as that in the seventh range.

* * * * *